July 8, 1952      R. W. RUMBLE      2,602,210
SHUTTERING FOR MOLDING CONCRETE WALLS IN SITU
Filed Aug. 2, 1947      2 SHEETS—SHEET 1
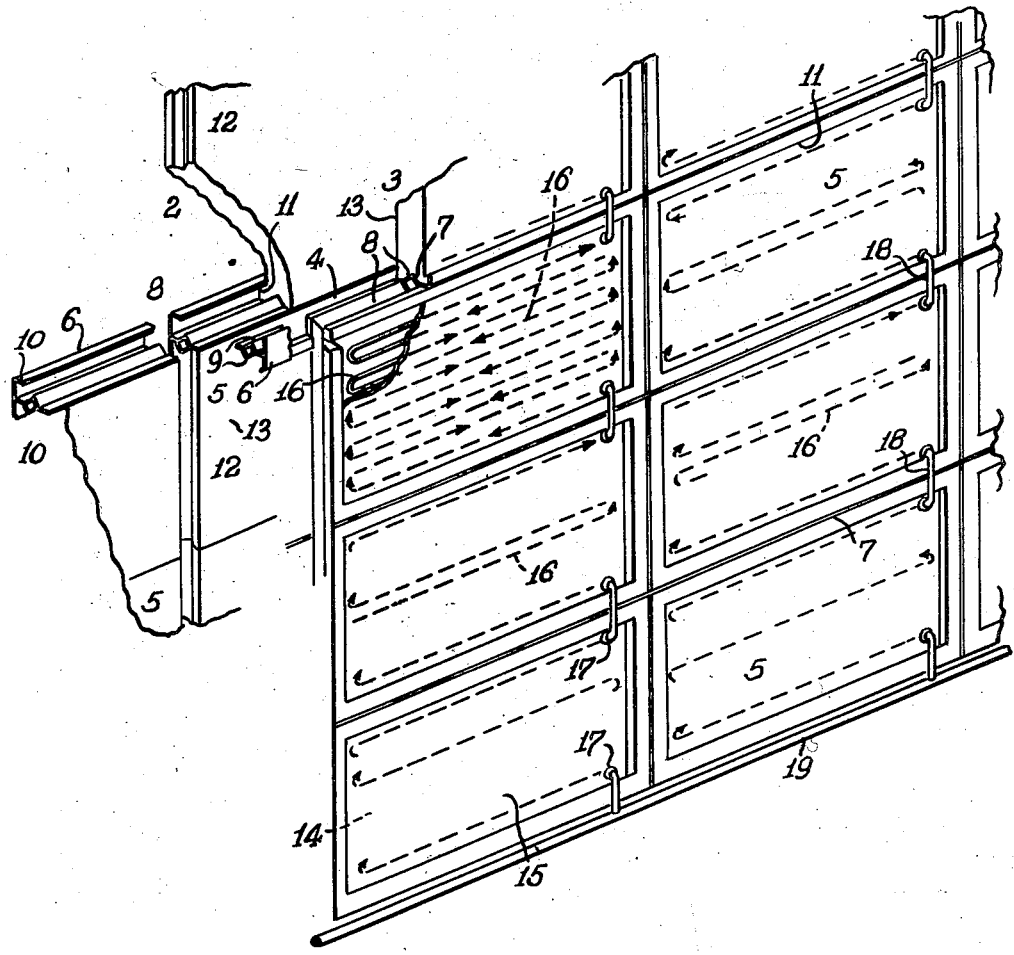
Inventor
Roy WILLIAM RUMBLE
By Haseltine, Lake & Co.
Agents

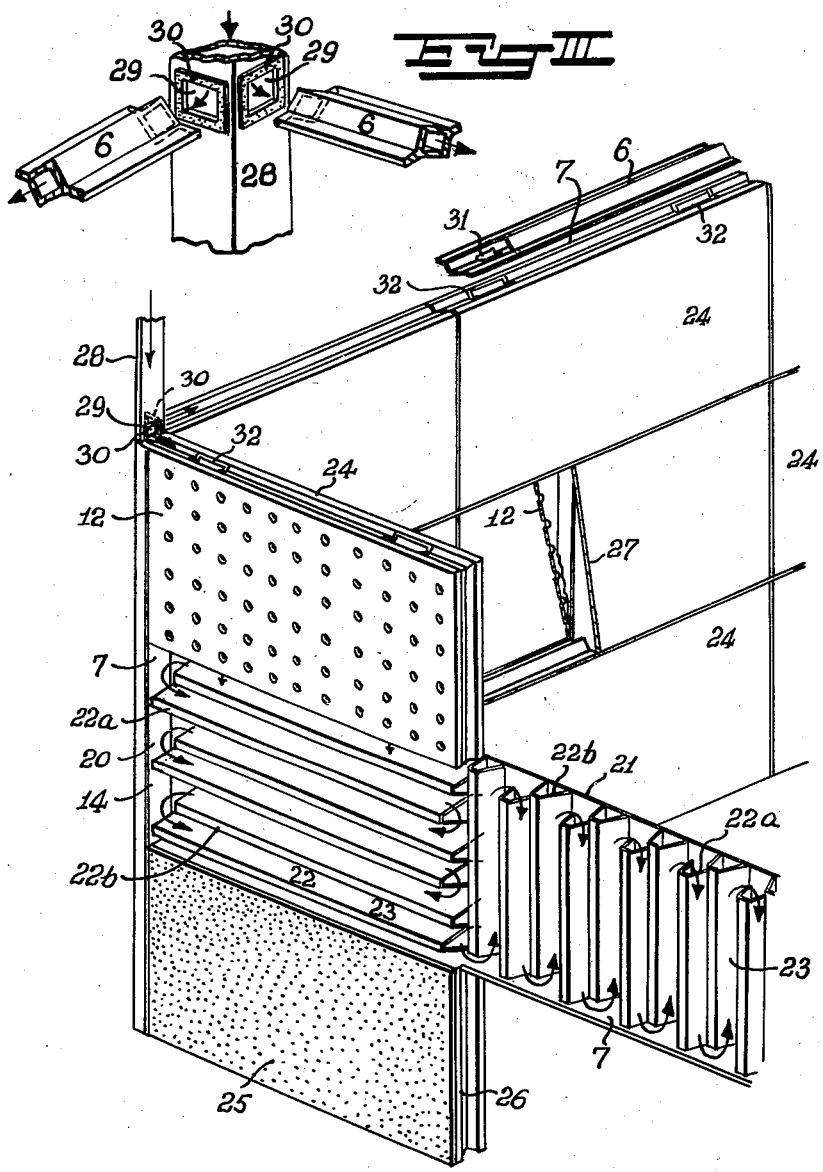

Patented July 8, 1952

2,602,210

UNITED STATES PATENT OFFICE 2,602,210

SHUTTERING FOR MOLDING CONCRETE WALLS IN SITU

Roy William Rumble, Pretoria, Transvaal, Union of South Africa

Application August 2, 1947, Serial No. 765,659
In the Union of South Africa September 21, 1945

Section 1, Public Law 690, August 8, 1946
Patent expires September 21, 1965

8 Claims. (Cl. 25—131)

This invention relates to shuttering for forming concrete buildings and structures from building material that is moulded in situ while plastic and is thereafter caused or allowed to set. Usually such material is concrete.

In moulding a building in situ, it is often desirable to subject the moulded but unset material to treatment. As examples, such treatment may consist in modifying the temperature of the material by either heating or cooling it. Concrete may for instance be heated in order to promote its setting, or massive concrete may be artificially cooled in order to hasten the elimination of the heat given out by the exothermic setting of the cement. Then again the treatment may consist in injecting into the moulded material a fluid substance for instance to promote or hasten setting, such treatment being described and claimed in my co-pending United States application Serial No. 765,657, filed August 2, 1947, now abandoned. Or again the treatment may consist in withdrawing surplus liquid from the moulded material in order to promote rapid setting, which treatment is described or claimed in my co-pending United States application Serial No. 765,658, filed August 2, 1947, now abandoned.

The object of the present invention is to provide a shuttering assembly and units suitable to be connected together to form such an assembly, which are well adapted for such treatment to be applied to the moulded material while the shuttering remains in the moulding position.

Shuttering according to the invention is formed with a rigid face plate providing the moulding face, and the plate is fluid-pervious. The shuttering comprises an internal cavity separated from the moulding cavity by the plate, and means to connect the cavity with external structure in fluid-transferring relationship. The external structure may be a source of fluid, if the fluid is to be passed through the pervious plate; or if fluid is to be withdrawn from the moulded material through the pervious plate, the external structure may be suction means to create a condition of sub-atmospheric pressure in the cavity.

A convenient form of cavity is to provide a series of channels in the shuttering, the channels intercommunicating to form a continuous conduit, which is connected to said external structure. The channels may consist of a pipe grid, or of corrugated stiffening formations. In the latter case, the channels may be defined by the back and face plates and the formations.

There may also be provided a filter medium associated with the face plate and such medium may itself provide the moulding face. When liquid is drawn from the moulded material the medium acts to prevent fine solid matter suspended in the liquid from being withdrawn.

The shuttering is desirably assembled from shuttering units. In that case, each unit comprises elements which collectively provide the shuttering features mentioned above. That is to say each comprises a rigid face plate and the plates of the assembled units together provide a continuous moulding face, and each comprises also a back plate and a cavity or channels, means being provided to connect the cavities or channels to constitute one or more continuous conduits through which fluid may be forced, or surplus liquid withdrawn through the moulding face of each unit.

The invention is illustrated in the accompanying drawings in which

Figure I shows a pair of shuttering walls forming a moulding space between them, Figure II is a similar view, but showing modified shuttering and Figure III is an enlarged detail of part of Figure II.

Figure I shows a pair of shuttering walls 2 and 3 forming between them a space 4 in which plastic concrete is placed to form the wall of a building.

Each wall is constructed of panels 5 and waling members 6. The edges 7 of the panels are formed with grooves 8 in which the tongued edges 9 of the waling members 6 engage; the waling members having hooked flanges 10 which engage with shoulders 11 of the panels to hold the latter in position in the wall. Each panel comprises a thin face plate 12 which provides the moulding face 13 of the panel and from which plate the formed edges 7 extend backward to form a shallow cavity 14 which is covered in by a back plate 15. The thin plate 12 is suitably stiffened to sustain the pressure of the concrete mix.

In the cavity 14 of the panel is provided the grid 16 made of pipe. At the respective ends of the grid are the coupling connections 17 exposed to be connected by the coupling pipes 18.

Each pipe grid 16 is welded or otherwise connected to the back of its face plate 12 so that it forms the means for stiffening said plate and is in rapid heat conducting relationship with said plate.

In the use of this kind of shuttering the units are built up as described. A fluid supply pipe 19 is provided and coupled to the grids 16 in the panels; either to individual grids or to groups of connected grids as shown. When the concrete has been poured into the cavity 4, an appropriate fluid is fed to the grids from the pipe 19, such as steam to accelerate the setting of the concrete; or cold water or air to minimize heating of the concrete and thereby prevent its expanding unduly. Outlets from the grids 16 may be provided; so that the fluid may be continuously circulated.

Figure II shows various other features of panels constructed according to the invention. The panels marked 20 and 21 are of much the same construction as those shown in Figure I but have stiffening structure consisting of sheet metal ribs 22 welded or similarly secured to the back of the face plate 12. The panels are usually made of oblong form; and in the example marked 20, the ribs 22 extend parallel to the long edges of the panel, whilst those in panel 21 extend parallel to the short edges of the panel.

Alternate ribs such as 22ª abut at one end against the interior of panel edges 7, and are spaced from the adjacent panel edges at their other ends. The intervening ribs 22ᵇ are oppositely arranged so that the collection of ribs forms a grid channel 23 similar to that formed by the pipe grids 16 in Figure I.

The panels indicated by 24 have their moulding plates 12 perforated for the passing of fluid forced under pressure from the interior cavities of the panels to the moulded material; or for the passage of fluid from the moulded material into the panel cavities by suction set up in the latter. If it is desired to prevent the movement of solids for example cement particles in suspension in superfluous water that is withdrawn from the mould cavity, a filter layer 25 is provided either within the face plate or at the external face of said plate as shown in the case of the panel marked 26. When hot or cold fluid is circulated through the panels, heat transfer through the back of the panel is minimized by a layer of heat insulating material 27 at the back of the panel.

In the examples shown in Figure II the fluid connections to the interior of the panels described are made through the hollow corner members 28 of the shuttering and the hollow waling members 6. The corner member shown is fitted at say its upper end with any convenient means such as a hose for connecting its internal cavity to a source of supply of fluid under pressure or to a vacuum chamber as the case may be. Apertures 29 are formed in the sides of said corner member and are provided with resilient gaskets 30 for jointing with the ends of the waling members which are pressed into contact with them. Similarly gasketed apertures 31 in the sides of the waling members connect with gasketed apertures 32 in the edges 7 of the panels to continue the fluid passages into the interior cavities of the panels, which are closed in fluid tightly by the back plates 24.

I claim:

1. Shuttering for moulding material for a building in situ, said shuttering consisting of an assembly of separable units each comprising a rigid flat plate, one face of which constitutes a moulding face, the faces of the units providing collectively a continuous plane moulding surface, a back plate rigidly attached to the flat plate in spaced relationship so as to provide an internal cavity between the two plates, channels within each cavity providing a conduit, means between the units for connecting the conduits of the units in series to form a single extended continuous conduit; means to connect the extended conduit to external structure in fluid transferring relationship; and a series of apertures through the face plate and providing communication between the moulding face and the conduit.

2. The shuttering claimed in claim 1 wherein said channels are parallel.

3. The shuttering claimed in claim 1 wherein the channels comprise parallel stiffening formations between the plates, the formations in adjacent units running respectively horizontally and vertically; the formations in each unit being spaced alternately from one and the other edge of the cavity wall.

4. A shuttering unit having means for separably connecting it with other units to form a shuttering assembly suitable for moulding material for a building, the unit comprising a rigid flat plate one face of which constitutes a moulding face, a back plate connected to the flat plate in spaced relationship so as to provide a cavity between the two plates; channels provided within each cavity, means connecting the channels of each unit in series to form (when assembled with other units) an extended and continuous conduit, means to connect the conduit to external structure in fluid-transferring relationship and a series of apertures through the face plate and providing communication between the conduit and the moulding face.

5. The unit claimed in claim 4 wherein said channels are parallel.

6. The unit claimed in claim 4 wherein the channels are staggered with those of alternate formation in line with each other.

7. Shuttering for moulding material for a building, comprising an assembly of separable units each comprising a rigid flat plate one face of which constitutes a moulding face, the faces of the units providing collectively a continuous plane moulding surface, a back plate rigidly attached to the flat plate in spaced relationship so as to provide an internal cavity between the plates, channeling in the cavity providing a conduit, a series of apertures in the moulding face of each unit providing communication between the moulding face and the channeling of the unit, structure on each unit at each horizontal edge recessed to receive complementally shaped waling members between adjacent horizontal edges and thereby to align the units against relative movement in the horizontal plane, the waling members crossing the vertical joints of adjacent units; the said waling members being shaped to provide an internal cavity and apertures at intervals; apertures in the horizontal edges of the units which register with the apertures in the waling members to connect the conduits with the cavities of the waling members; and means to connect the cavities of the waling members with external structure in fluid-transferring relationship.

8. Shuttering as claimed in claim 7 comprising parallel stiffening formations between the two plates of each unit, the channeling being defined by the two plates and the formations, adjacent formations having their ends staggered with the ends of alternate formations in line with each other; and the formations of adjacent units running respectively vertically and horizontally.

ROY WILLIAM RUMBLE.

REFERENCES CITED

The following references are of record in the file of this patent:

UNITED STATES PATENTS

| Number | Name | Date |
|---|---|---|
| 1,460,197 | George | June 26, 1923 |
| 1,945,145 | Gordon | Jan. 30, 1934 |
| 2,046,867 | Billner | July 7, 1936 |
| 2,116,557 | Billner | May 10, 1938 |
| 2,317,997 | Lapidus | May 4, 1943 |
| 2,442,738 | Whittenberg | June 1, 1948 |

FOREIGN PATENTS

| Number | Country | Date |
|---|---|---|
| 117,796 | Australia | Dec. 2, 1943 |